US011736981B2

(12) United States Patent
Shen

(10) Patent No.: US 11,736,981 B2
(45) Date of Patent: Aug. 22, 2023

(54) METHOD, APPARATUS AND COMPUTER READABLE MEDIA FOR ENFORCING A RULE RELATED TO TRAFFIC ROUTING

(71) Applicant: NOKIA SOLUTIONS AND NETWORKS OY, Espoo (FI)

(72) Inventor: Yang Shen, Beijing (CN)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 6 days.

(21) Appl. No.: 17/056,177

(22) PCT Filed: May 22, 2018

(86) PCT No.: PCT/CN2018/087770
§ 371 (c)(1),
(2) Date: Nov. 17, 2020

(87) PCT Pub. No.: WO2019/222901
PCT Pub. Date: Nov. 28, 2019

(65) Prior Publication Data
US 2021/0211938 A1 Jul. 8, 2021

(51) Int. Cl.
H04W 28/08 (2023.01)
H04W 28/02 (2009.01)
(Continued)

(52) U.S. Cl.
CPC ... H04W 28/0925 (2020.05); H04W 28/0268 (2013.01); H04W 28/0992 (2020.05); H04W 40/02 (2013.01); H04W 40/34 (2013.01)

(58) Field of Classification Search
CPC ......... H04W 28/0268; H04W 28/0925; H04W 28/0992; H04W 40/00; H04W 40/02;
(Continued)

(56) References Cited

U.S. PATENT DOCUMENTS

2012/0196644 A1* 8/2012 Scherzer ............... H04W 72/02
455/524
2014/0287746 A1* 9/2014 Faccin .............. H04W 72/0493
455/433
(Continued)

FOREIGN PATENT DOCUMENTS

WO WO-2016095992 A1 * 6/2016
WO WO 2018/030474 A1 2/2018

OTHER PUBLICATIONS

"3rd Generation Partnership Project; Technical Specification Group Services and System Aspects; Policy and Charging Control Framework for the 5G System; Stage 2 (Release 15)", 3GPP TS 23.503 v15.1.0 (Mar. 2018), 65 pages.
(Continued)

Primary Examiner — Nathan S Taylor
(74) Attorney, Agent, or Firm — Alston & Bird LLP

(57) ABSTRACT

Embodiments of the present disclosure relate to methods, apparatuses and computer program products for enforcing a rule related to traffic routing. A method implemented at a terminal device comprises receiving a rule related to traffic routing for traffic and enforcement information for the rule; and controlling enforcement of the rule based on the enforcement information. The enforcement information indicates whether a modification to a PDU session associated with the traffic due to the enforcement of the rule is allowed.

22 Claims, 4 Drawing Sheets

(51) Int. Cl.
*H04W 40/02* (2009.01)
*H04W 40/34* (2009.01)

(58) Field of Classification Search
CPC ..... H04W 40/34; H04W 76/22; H04W 28/02; H04W 28/08; H04W 28/16
See application file for complete search history.

(56) References Cited

U.S. PATENT DOCUMENTS

| | | | | |
|---|---|---|---|---|
| 2015/0003253 A1* | 1/2015 | Wolfner | ............ | H04W 28/0925 370/237 |
| 2015/0045015 A1* | 2/2015 | Ye | ............ | H04W 48/08 455/424 |
| 2015/0111569 A1* | 4/2015 | Gupta | ............ | H04W 8/08 455/552.1 |
| 2015/0188810 A1* | 7/2015 | Salkintzis | ............ | H04W 40/00 370/328 |
| 2015/0312808 A1* | 10/2015 | Kiss | ............ | H04W 4/24 370/331 |
| 2016/0057678 A1* | 2/2016 | Salkintzis | ............ | H04W 48/12 370/230 |
| 2017/0181070 A1* | 6/2017 | Gupta | ............ | H04W 28/08 |
| 2017/0332226 A1* | 11/2017 | Bharatia | ............ | H04W 8/06 |
| 2017/0366399 A1* | 12/2017 | Li | ............ | H04W 40/34 |
| 2017/0367026 A1* | 12/2017 | Li | ............ | H04W 12/06 |
| 2018/0054765 A1* | 2/2018 | Kim | ............ | H04W 36/06 |
| 2018/0192471 A1* | 7/2018 | Li | ............ | H04W 4/60 |
| 2019/0215724 A1* | 7/2019 | Talebi Fard | ............ | H04W 48/16 |
| 2019/0261449 A1* | 8/2019 | Kim | ............ | H04L 65/1046 |
| 2019/0268835 A1* | 8/2019 | Shan | ............ | H04W 48/16 |
| 2019/0357278 A1* | 11/2019 | Kawasaki | ............ | H04W 60/00 |
| 2020/0107190 A1* | 4/2020 | Tang | ............ | H04W 12/033 |
| 2020/0404567 A1* | 12/2020 | Tang | ............ | H04W 8/18 |
| 2020/0412559 A1* | 12/2020 | Tang | ............ | H04L 47/805 |
| 2021/0152615 A1* | 5/2021 | Karampatsis | ............ | H04W 40/22 |

OTHER PUBLICATIONS

"3rd Generation Partnership Project; Technical Specification Group Services and System Aspects; Architectore enhancements for non-3GPP accesses (Release 15)", 3GPP TS 23.402 v15.3.0 (Mar. 2018), 314 pages.

Ravindran et al., "Realizing ICN in 3GPP's 5G NextGen Core Architecture", arXiv (Nov. 7, 2017), pp. 1-7.

International Search Report and Written Opinion for Patent Cooperation Treaty Application No. PCT/CN2018/087770 dated Feb. 26, 2019, 6 pages.

Extended European Search Report for European Application No. 18919923.5 dated Dec. 14, 2021, 13 pages.

Oppo et al., "Clarification on UE Policy Configuration", SA WG2 Meeting #127, S2-183205, (Apr. 16-20, 2018), 5 pages.

Huawei et al., "SSC Mode Selection", 3GPP TSG-SA WG2 Meeting #126, S2-182811, (Feb. 26-Mar. 2, 2018), 3 pages.

* cited by examiner

METHOD, APPARATUS AND COMPUTER READABLE MEDIA FOR ENFORCING A RULE RELATED TO TRAFFIC ROUTING

CROSS-REFERENCE TO RELATED APPLICATIONS

This application is a national phase entry of International Application No. PCT/CN2018/087770, filed May 22, 2020, the entire contents of which are incorporated herein by reference.

FIELD

Non-limiting and example embodiments of the present disclosure generally relate to a technical field of communication, and specifically to methods, apparatuses and computer program products for enforcing a rule related to traffic routing.

BACKGROUND

This section introduces aspects that may facilitate better understanding of the disclosure. Accordingly, the statements of this section are to be read in this light and are not to be understood as admissions about what is in the prior art or what is not in the prior art.

With development of communication techniques, more and more services/applications and more and more methods for accessing a network are provided to users. In order to improve resource utilization efficiency, to meet quality requirements for various services, and/or to allow the flexible operator configuration to the UE, a concept of user equipment (UE) policy has been proposed.

For example, with an introduction of the fifth generation (5G) communication technique, UE policy has been defined in technical specifications, such as TS 23.503 vf10 developed by the third generation partnership project (3GPP). According to the specifications of 3GPP, a 5G core network (5GC) shall be able to provide policy information from a Policy Control Function (PCF) to UE. Such UE policy information may include an Access Network Discovery & Selection Policy (ANDSP) and an UE Route Selection Policy (URSP).

The ANDSP is used by the UE for selecting non-3GPP accesses and deciding how to route traffic between the selected 3GPP and non-3GPP accesses. The URSP is used by the UE to determine how to route outgoing traffic. For example, based on the URSP, UE may route the traffic to an established Protocol Data Unit (PDU) Session, offloaded the traffic to non-3GPP access outside a PDU Session, or trigger establishment of a new PDU Session for the traffic.

SUMMARY

Various embodiments of the present disclosure mainly aim at providing methods, apparatuses and computer program products for enforcing a rule related to traffic routing in a communication network.

In a first aspect of the disclosure, there is provided a method implemented at a terminal device. The method comprises receiving the rule for traffic, receiving enforcement information for the rule, and controlling enforcement of the rule based on the enforcement information. The enforcement information indicates whether a modification to a Protocol Data Unit (PDU) session associated with the traffic due to enforcement of the rule is allowed;

In an embodiment, controlling enforcement of the rule based on the enforcement information may comprise: in response to a current PDU session associated with the traffic failing to satisfy the rule, determining whether a modification to the current PDU session associated with the traffic due to enforcement of the rule is allowed based on the enforcement information; and in response to determining that the modification is allowed, enforcing the rule by one of: modifying the current PDU session to satisfy the rule; associating the traffic to a further PDU session selected from existing PDU sessions satisfying the rule; and creating, for the traffic, a new PDU session satisfying the rule.

In another embodiment, controlling enforcement of the rule based on the enforcement information may comprise: in response to a current PDU session failing to satisfy the rule, determining whether a modification to the current PDU session associated with the traffic due to enforcement of the rule is allowed based on the enforcement information and whether switching the traffic from the current PDU session to a further PDU session is allowed; and controlling enforcement of the rule based on the determination.

In some embodiments, controlling enforcement of the rule based on the enforcement information may comprise: in response to a current PDU session failing to satisfy the rule, checking whether it is allowed to switch the traffic from the current PDU session to a further PDU session; and in response to the switching being unallowable, determining whether a modification to the current PDU session associated with the traffic due to enforcement of the rule is allowed based on the enforcement information; and controlling enforcement of the rule based on the determination.

In still another embodiment, controlling enforcement of the rule based on whether the modification and the switching are allowed may comprise: in response to determining that the modification is unallowable and the switching is allowed, enforcing the rule by one of: associating the traffic to a further PDU session selected from existing PDU sessions satisfying the rule, and creating a new PDU session satisfying the rule for the traffic.

In some embodiments, controlling enforcement of the rule based on whether the modification and the switching are allowed may comprise in response to determining that the modification is allowed and the switching is unallowable, enforcing the rule by: modifying the current PDU session to satisfy the rule.

In some embodiments, controlling enforcement of the rule based on whether the modification and the switching are allowed may comprise: in response to determining that the modification is allowed and the switching is unallowable, determining whether a route selection related parameter for the traffic matches with the rule; and in response to determining that the route selection parameter matches with the rule, enforcing the rule by modifying the current PDU session to satisfy the rule.

In a further embodiment, determining whether a route selection related parameter for the traffic matches with the rule may comprise: determining whether a route selection related parameter for each of the traffic associated with the current PDU session matches with the rule; and determining that the route selection related parameter matches with the rule, if the route selection related parameter for each of the traffic associated with the current PDU session matches with the rule.

In some embodiments, controlling enforcement of the rule based on the enforcement information may comprise: in response to determining that neither of the modification and the switching is allowed, rejecting the rule.

In some embodiments, controlling enforcement of the rule based on the enforcement information may comprise: in response to determining that both the modification and the switching are allowed, enforcing the rule by one of: modifying the current PDU session to satisfy the rule; associating the traffic to a further PDU session selected from existing PDU sessions satisfying the rule; and creating, for the traffic, a new PDU session satisfying the rule.

In some embodiments, a plurality of traffic are associated with the current PDU session and enforcement information is configured for each of the plurality of traffic, and wherein determining whether a modification to the current PDU session associated with the traffic due to enforcement of the rule is allowed may further comprise: checking enforcement information for all of the plurality of traffic; and determining that the modification is allowed only if enforcement information for all of the plurality of traffic indicates that a modification to the current PDU session is allowed.

In some embodiments, determining whether switching the traffic from the current PDU session to a further PDU session is allowed may comprise: checking whether the switching is allowed by a rule enforced previously and the rule received, respectively; and determining that the switching is unallowable, if the switching is unallowable by both the rule enforced previously and the rule received.

In some embodiments, rejecting the rule may comprise sending a rejection message to a network device from which the rule is received.

In some embodiments, the enforcement information may further include a validation condition for the rule, and the controlling enforcement of the rule may be further based on the validation condition. In some embodiments, the validation condition may comprise at least one of the following: time for enforcing the rule; allowed enforcement delay for the rule.

In some embodiments, the terminal device may receive a message including the rule and the enforcement information from a Policy Control Function (PCF).

In some further embodiments, the method may further comprise: receiving a notification on failure of new PDU session establishment due to enforcement of the rule; and determining whether to enforce the rule by modifying an existing PDU session based on the enforcement information and a route selection related parameter for each traffic associated with the existing PDU session.

In a second aspect of the disclosure, there is provided a method at a network device, e.g., a PCF. The method comprises: obtaining the rule for traffic of a terminal device; determining enforcement information for the rule, the enforcement information indicating whether a modification to a Protocol Data Unit, PDU, session associated with the traffic due to enforcement of the rule is allowed; and sending the rule and the enforcement information to the terminal device.

In a third aspect of the present disclosure, there is provided a terminal device. The terminal device comprises at least one processor and at least one memory including computer program code. The at least one memory and the computer program code are configured to, with the at least one processor, cause the terminal device at least to perform a method according to the first aspect of the present disclosure.

In a fourth aspect of the present disclosure, there is provided a network device. The network device comprises at least one processor and at least one memory including computer program code. The at least one memory and the computer program code are configured to, with the at least one processor, cause the network device at least to perform a method according to the second aspect of the present disclosure.

In a fifth aspect of the disclosure, there is provided a computer program. The computer program comprises instructions which, when executed by an apparatus, causes the apparatus to carry out the method according to the first aspect of the present disclosure.

In a sixth aspect of the disclosure, there is provided a computer program. The computer program comprises instructions which, when executed by an apparatus, causes the apparatus to carry out the method according to the second aspect of the present disclosure.

In a seventh aspect of the disclosure, there is provided a computer readable medium with a computer program stored thereon which, when executed by an apparatus, causes the apparatus to carry out the method of the first aspect of the present disclosure.

In an eighth aspect of the disclosure, there is provided a computer readable medium with a computer program stored thereon which, when executed by an apparatus, causes the apparatus to carry out the method of the second aspect of the present disclosure.

In a ninth aspect of the present disclosure, there is provided a terminal device. The terminal device comprises means for receiving a rule related to traffic routing for traffic, and enforcement information for the rule; and means for controlling enforcement of the rule based on the enforcement information. The enforcement information indicates whether a modification to a PDU session associated with the traffic due to enforcement of the rule is allowed.

In a tenth aspect of the present disclosure, there is provided a network device. The network device comprises means for obtaining the rule for traffic of a terminal device; means for determining enforcement information for the rule, the enforcement information indicating whether a modification to a PDU session associated with the traffic due to enforcement of the rule is allowed; and means for sending the rule and the enforcement information to the terminal device.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
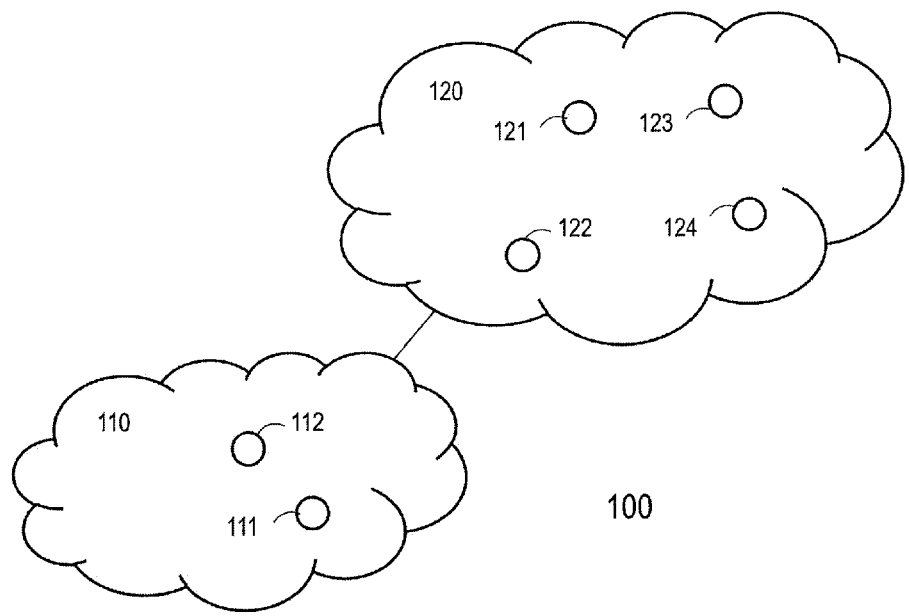
FIG. 1 illustrates an example communication network in which embodiments of the present disclosure may be implemented.

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as 5G, New Radio (NR), Long Term Evolution (LTE), LTE-Advanced (LTE-A), Wideband Code Division Multiple Access (WCDMA), High-Speed Packet Access (HSPA), and so on. The "communication network" may also be referred to as a "communication system." Furthermore, communications between network devices, between a network device and a terminal device, or between terminal devices in the communication network may be performed according to any suitable communication protocol, including, but not limited to, Global System for Mobile Communications (GSM), Universal Mobile Telecommunications System (UMTS), Long Term Evolution (LTE), New Radio (NR), 5G, wireless local area network (WLAN) standards, such as the IEEE 802.11 standards, and/or any other appropriate communication standard either currently known or to be developed in the future.

As used herein, the term "network device" refers to a node in a communication network via which a terminal device receives services and/or information related to the services. For example, the network device may include a network node in a core network (CN), such as a PCF or a gateway.

The term "terminal device" refers to any end device that may be capable of communication. By way of example rather than limitation, a terminal device may also be referred to as a communication device, UE, a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (JOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

FIG. 1 illustrates an example communication network 100 in which embodiments of the present disclosure may be implemented. As shown, the communication network 100 may include an access network 110 and a core network (CN) 120. UE 111 may receive services from the core network 120 via a base station (BS) 112 in the access network 110. The core network 120 may include one or more network devices, such as a PCT 121, a gateway (GW) 122, a unified data repository (UDR) 123, and an application server (AS) 124. Note that the communication network 100 may include further access network, terminal devices and/or core network devices which are not shown in FIG. 1 for simplicity.

UE in a communication network may be offered various services which may have different quality of service (QoS) requirements with respect to delay or packet error rate. In order to improve resource utilization efficiency and/or to meet quality requirements for various services, UE policy information may be provided from a CN (e.g., a PCF in the CN) to the UE. Such UE policy information may include ANDSP and URSP.

According to current 3GPP technical specifications, e.g., TS 23.503 vf10, each URSP contains multiple URSP rules. The structure of the URSP rules is described in Table 6.6.2.1-2 and Table 6.6.2.1-3 of 3GPP TS 23.503vf10, which are reproduced below.

TABLE 6.6.2.1-2

UE Route Selection Policy Rule

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the traffic descriptors for the policy | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| List of Route Selection Descriptors | A list of Route Selection Descriptors. The components of a Route Selection Descriptor are described in table 6.6.2.1-3 | Mandatory | | |

NOTE 1:
Rules in a URSP shall have different precedence values.

TABLE 6.6.2.1-3

Route Selection Descriptor

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. | Optional | Yes | UE context |
| Network Slice Selection | Either a single value or a list of values of S-NSSAI(s). | Optional | Yes | UE context |
| DNN Selection | Either a single value or a list of values of DNN(s). | Optional | Yes | UE context |
| Non-seamless Offload indication | Indicates if the traffic of the matching application is to be offloaded to non-3GPP access outside of a PDU Session. | Optional (NOTE 3) | Yes | UE context |
| Access Type preference | Indicates the preferred Access Type (3GPP or non-3GPP) when the UE establishes a PDU Session for the matching application. | Optional | Yes | UE context |

NOTE 1:
Every Route Selection Descriptor in the list shall have a different precedence value.
NOTE 2:
At least one of the route selection component shall be present.
NOTE 3:
If this indication is present in a Route Selection Descriptor, no other components shall be included in the Route Selection Descriptor.

As shown in these Tables, URSP rules for UE include traffic descriptors that specify the matching criteria and one or more of the following components:

a) SSC Mode Selection Policy (SSCMSP): This is used by the UE to associate the matching application with SSC modes.

b) Network Slice Selection Policy (NSSP): This is used by the UE to associate the matching application with S-NSSAI.

c) DNN Selection Policy: This is used by the UE to associate the matching application with DNN.

d) Non-seamless Offload Policy: This is used by the UE to determine that the matching application should be non-seamlessly offloaded to non-3GPP access (i.e. outside of a PDU Session).

e) Access Type preference: If the UE needs to establish a PDU Session for the matching application, this indicates the preferred Access Type (3GPP or non-3GPP).

In addition, each URSP rule may contain multiple Route Selection Descriptors (RSDs), which are selected in order based on their precedence values.

The PCF may select the URSP applicable for each UE based on local configuration and operator policies taking into consideration e.g. accumulated usage, load level information per network slice instance, UE location, etc. When valid URSP rules are available, the UE performs the association to a PDU session based on user preference and these URSP rules.

The PCF may reselect URSP rules for the UE when operator policy is changed or any condition triggering the URSP reselection is met. In response to receiving a new/updated URSP rules from the PCF, the UE may modify an existing PDU session, associate the traffic to another existing PDU session matching the updated rule, or establish a new PDU session for the traffic.

For instance, an original URSP rule may be successfully enforced by the UE, and then the original URSP rule associated with traffic of the UE may be modified by a PCF, or a new URSP rule may be generated by the PCF for the traffic of the UE. In both cases, the PCF may send a new/updated rule to the UE for enforcing at the UE side.

However, currently, the enforcement of a new/updated URSP rule at the UE may lead to several problems. For example, the enforcement of a new/updated URSP rule at the UE may lead to a change of the current PDU session. It means that an IP address of the PDU session may be changed as well; therefore, the application traffic may be broken. Further, the enforcement of a new/updated URSP rule may lead to a modification of the current PDU session. If the current PDU session is shared by multiple application traffic, the modification of the PDU session may have a negative impact on some application traffic to which the new URSP rule is not applicable. The enforcement of a new/updated URSP rule may also lead to an increase in total number of PDU sessions. In addition, if new PDU session establishment is rejected by the network, modification of the existing PDU session has to be considered.

Inventor of the present disclosure has observed that different applications/services may have different tolerance to the negative impact caused by URSP rule update. For example, some applications are capable of maintaining the service continuity at the application level. Furthermore, for some application, a traffic break may not impact user experience. Therefore, for such applications, UE may move the traffic from one PDU session to another PDU session without causing a negative impact on UE experience. However, for applications sensitive to the traffic break, it is critical to keep the running traffic un-impacted.

In addition, operators of the network may have some specific requirement for the enhancement of URSP rules. For example, depending on nature of the URSP rules to be enforced, an operator may require the rules to be applied at any time determined by the UE, or at exactly a time point (e.g. billing cycle) pre-set. In some scenarios, it may be critical for a new URSP rule to be enforced by the UE immediately, and in such a case, the operator may expect that the rules be enforced within a predefined time period. However, some on-going traffic (e.g. mobile surveillance service) cannot be stopped at/within the predefined time.

Therefore, in order to determine a proper time point for enforcing an URSP rule, avoid a negative impact to on-going traffic/user experience, or reduce the negative impact to a tolerable level, UE may need knowledge about a requirement for an application and/or a network preference. However, such information is unavailable to the UE currently.

On the other hand, the operators/applications may expect a new/updated URSP rule to be efficiently enforced by the UE. However, there's no way for the operators/applications to inform the UE of their requirements/expectation currently.

3GPP TS 23.402 specifies validity conditions of WLAN selection policy (WLANSP) in Section 4.8.2.1.6, which are reproduced below.

"Validity conditions, i.e. conditions indicating when the provided rule is valid. The validity conditions can include the time of day, geolocation, network location (e.g. PLMN, Location Area), etc."

However, such validation condition fails to take requirements for an application into account.

In the current technical specification for 5G systems (e.g., TS 23.503 vf10), no validity condition is defined for the URSP. Instead, enforcement of an updated URSP is totally left to UE implementation without taking any operator/ application requirement into consideration. That is, the problem of breaking on-going traffic is not considered.

To solve at least part of the above problems and other potential problems, methods, apparatuses, and computer readable media for enforcing a rule related to traffic routing have been proposed in the present disclosure.

In some embodiments, information required to derive a URSP rule may be provisioned or updated by an application service provider (ASP). For example, the ASP may indicate validation time and a UE address continuity requirement. URSP rules associated with traffic may be derived and stored, for example, in a UDR. In some embodiments, enforcement information for a URSP rule, which specifies when and/or how to enforce the URSP rule at the UE side, is also maintained in the UDR. Alternatively, in some embodiments, the enforcement information for the URSP rule may be generated by a PCF dynamically.

In some embodiments, the enforcement information for a URSP rule may include one or both of: a validation condition, and an indication on whether a modification to a PDU session associated with ongoing traffic of the UE due to enforcement of the rule is allowed due to the update of the URSP rule of the present traffic or other application traffic sharing the same PDU session.

In particular, the validation condition may specify one or more of: enforcement time of the URSP rule, and an allowed enforcement delay for the URSP rule. For illustration rather than limitation, the enforcement time may include a time point of a day, or indicate to UE that enforcement of the rule may be enforced at any time before the traffic restarts, etc. In some embodiment, absence of the validation condition means the URSP can be installed at any time before the traffic restarts.

The indication on whether a modification to a PDU session is allowed due to enforcement of the rule may be used by the UE to decide whether to modify a current PDU session associated with the application traffic, or associating the application traffic to another PDU session. In some embodiments, this indication may be utilized by the UE to determine whether and/or how to enforce a URSP rule, when associating the application traffic to another PDU session is unallowable and when validation condition for the URSP rule is satisfied, e.g., when the enforcement time for the URSP rule approaches.

In some embodiments, UE may determine whether associating the application traffic to another PDU session is allowed based on a UE address continuity requirement for an application associated with the traffic. In some embodiments, UE may determine whether associating the application traffic to another PDU session is allowed based on SSC mode specified in a URSP rule received by the UE. For example, the URSP rule may include information shown in Table 6.6.2.1-3 of 3GPP TS 23.503 vf10, and if the field of "SSC Mode Selection" in the Table 6.6.2.1-3 is set to "SSC mode 1", then UE determines that associating the application traffic to another PDU session is unallowable. If the field of "SSC Mode Selection" in the Table 6.6.2.1-3 is set to "SSC mode 2" or "SSC mode 3", then UE determines that associating the application traffic to another PDU session is allowed.

In some embodiments, the proposed enforcement information, optionally together with the information on whether associating the application traffic to another PDU session is allowed, may be used by the UE to determine whether/how to enforce a URSP rule. For example, when the validation condition for the URSP rule is met, e.g., when a time point of a day specified by the validation condition, or a time point satisfying an allowed enforcement delay specified by the validation condition, approaches, the UE may further check the indication on whether a modification to a PDU session associated with ongoing traffic of the UE due to enforcement of the rule is allowed, and possibly also the information on whether associating the application traffic to another PDU session is allowed, to determine a solution for the enforcement.

The enforcement information of the URSP rule is sent by a network device, for example but not limited to a PCF, to UE. In this way, the UE obtains knowledge on requirements from an operator and/or application, and this enables more efficient enforcement of the URSP rule at the UE side.

As an example rather than limitation, in some embodiments, the enforcement information of the URSP rule may be sent to the UE as a part of the URSP rule. For instance, the URSP rule may include information shown in Table 1.

TABLE 1

URSP Rule

| Information name | Description | Category | PCF permitted to modify in a UE context | Scope |
| --- | --- | --- | --- | --- |
| Rule Precedence | Determines the order the URSP rule is enforced in the UE. | Mandatory (NOTE 1) | Yes | UE context |
| Validation Condition | Determines when a URSP is installed, it can be: Time of the day a value of the allowed execution delay (NOTE X) | Optional | Yes | UE context |
| PDU session Modification allowed | It indicates permission of PDU session modification due to the update of the URSP rule of other application traffic which shares the same PDU session with it. It is used when the Validation Condition is set to be time of the day or the allowed enforcement delay. (NOTE 2) | Optional | Yes | UE context |
| Traffic descriptor | This part defines the traffic descriptors for the policy | | | |
| Application identifiers | Application identifier(s) | Optional | Yes | UE context |
| IP descriptors | IP 3 tuple(s) (destination IP address or IPv6 network prefix, destination port number, protocol ID of the protocol above IP) | Optional | Yes | UE context |
| Non-IP descriptors | Descriptor(s) for non-IP traffic | Optional | Yes | UE context |
| List of Route Selection Descriptors | A list of Route Selection Descriptors. The components of a Route Selection Descriptor are described in table 6.6.2.1-3 | Mandatory | | |

NOTE 1:
Rules in a URSP shall have different precedence values.
NOTE X:
Absence of "Validation condition" means the URSP can be installed at any time before the traffic starts next time.

In the embodiment shown in Table 1, the URSP rule includes enforcement information, i.e., an information element (IE) of "Validation Condition" and an IE of "PDU session Modification allowed". The IE of "Validation Condition" indicates when the URSP rule should be enforced, and the IE of "PDU session Modification allowed" indicates whether a modification to a current PDU session of the traffic due to enforcement of the URSP rule is allowed. Other IEs included in the URSP rule shown in Table 1 may be same as that specified in Table 6.6.2.1-2 of 3GPP TS 23.503 Vf10, content of which is incorporated herein by reference.

It should be appreciated that embodiments of the URSP rule are not limited to the exact content shown in Table 1, but could include more or less or different IEs.

In some embodiments, the enforcement information (e.g., the new IEs of "Validation Condition" and "PDU session Modification allowed" in Table 1) are optionally included in the URSP rule sent to UE. For example, the two IEs shown in Table 1 may not be included in an original URSP rule transmitted to the UE. Then when a further URSP rule is reselected or generated by the PCF after the original URSP rule has been successfully enforced at the UE, the PCF may send the reselected URSP rule to the UE, with one or both of the new IEs included in the reselected URSP rule.

In some embodiments, upon receiving an updated URSP rule for ongoing traffic, and determining that a rule precedence value for the updated rule is higher than that for a current URSP rule for the ongoing traffic, the UE may further check the enforcement information, e.g., Validation Condition of the updated URSP rule, if any. Then the UE may enforce the updated URSP rule based on the enforcement information, e.g., the enforcement time specified by the Validation Condition. For example, UE may enforce the updated URSP rule at a pre-defined time, within an allowed enforcement delay (value of which may be set to 0 if the updated URSP rule needs to be installed immediately), or at any time before the traffic restarts, based on the Validation Condition.

In some embodiments, according to the enforcement information, the updated URSP rule received by the UE may need to be enforced before ongoing-traffic ends, and in such embodiments, the UE may enforce the updated URSP rule via, for example, one of the following solutions A-C, if a current PDU session associated with the ongoing traffic fails to satisfy the updated URSP rule:

Solution A: reselecting an existing PDU session matching the updated URSP rule for the traffic if there is existing PDU session matching with the updated URSP rule;

Solution B: creating a new PDU session if none of the existing PDU session matches with the updated URSP rule;

Solution C: modifying the PDU session to which the traffic is currently bound, so as to match the updated URSP rule.

Alternatively or in addition, in some embodiments, the UE may further check whether association of the ongoing traffic is allowed to be changed to another PDU session, to decide a solution for the enforcement of the updated URSP rule. For example, if the updated URSP rule indicates a SSC mode 2 or SSC mode 3 which implies that the UE is allowed to switching a PDU session associated with the traffic from current PDU session to another one, the UE may decide to associate the ongoing traffic to another PDU session by above Solution A or Solution B, or modify an existing PDU session associated the ongoing traffic via above solution C. However, if both the original URSP rule and the updated URSP rule indicate a SSC mode 1 which implies prohibition of PDU session switch for the traffic, the UE may adopt Solution C above to enforce the updated URSP rule, i.e., modifying the current PDU session associated with the traffic.

However, modifying a PDU session associated with the traffic may be unacceptable for some application. Therefore, in some embodiments, it is proposed that enforcement information indicating whether a modification to a current PDU session associated with the traffic due to enforcement of the rule is allowed is sent to UE.

In some embodiments, the URSP rule may indicate that PDU session switch is unallowable (e.g., SSC mode 1 is selected) for the traffic, and at the same time enforcement information of the URSP rule indicates that a modification to the current PDU session is also prohibited, and in such a case, the UE may decide to reject the URSP rule.

In some embodiments, there may be a plurality of application traffic bound to the current PDU session, and in such embodiments, when choosing the above Solution C for enforcing an updated URSP rule, the UE may further check if the modification to the PDU session is allowed for all the application traffic currently bound to the PDU session. If the modification to the PDU session is unallowable for any of the plurality of application traffic, the UE may determine that the modification is unallowable (or prohibited), and decide not to use the Solution C.

In some embodiments, if any notification on failure of new PDU session establishment due to enforcement of an updated URSP rule is received by UE, the UE may adopt Solution C for enforcing the URSP rule. For example, in such a case, UE may evaluate whether a modification of an existing PDU session is possible, taking into consideration the field of "PDU session modification allowed" in Table 1 and the RSD value of each traffic currently associated to the PDU session. In some embodiments, UE may only evaluate modification of a PDU session which has the same SSC Mode Selection value as that configured in the updated URSP rule.

It should be appreciated that though some embodiments are described using URSP rule as an example for the rule related to traffic routing, embodiments of the present disclosure are not limited to enforcement of the URSP rules. Instead, embodiments of the present disclosure may be used for improving enforcement of any rule related to traffic routing in any communication network where similar problems exist.

In the following, to facilitate a better understanding of the proposed solutions, some embodiments will be described with reference to FIGS. 2-8.

Figure 2:
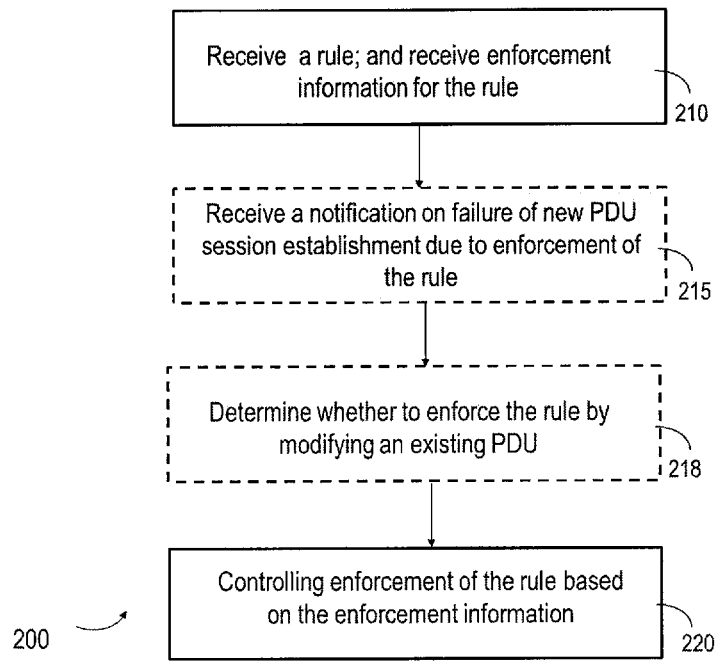
FIG. 2 shows a flowchart of a method at a terminal device according to an embodiment of the present disclosure.

FIG. 2 shows a flowchart of a method 200 implemented at a terminal device for enforcing a rule related to traffic routing. The terminal device may be, for example, the UE 111 shown in FIG. 1. For ease of discussion, the method 200 will be described below with reference to UE 111 and the communication network 100 illustrated in FIG. 1. However, embodiments of the present disclosure are not limited thereto.

At block 210, UE 111 receives the rule for its traffic and enforcement information for the rule. The enforcement information indicates whether a modification to a PDU session associated with the traffic due to enforcement of the rule is allowed.

As an example rather than limitation, the rule received at block 210 may include a URSP rule. For instance, the URSP rule may include information shown in Table 6.6.2.1-2 in 3GPP TS 23.503 vf10. The rule may be application traffic specific, and the application traffic may be identified by, e.g., a traffic descriptor specified by the rule.

Alternatively or in addition, at block 210, UE 111 may receive the rule and the enforcement information via a message from a PCF, e.g., PCF 121 shown in FIG. 1. However, embodiments are not limited thereto. In some embodiments, UE 111 may receive the rule and the enforcement information from a different network device, depending on network architecture involved.

At block 220, UE 111 enforces or rejects the rule based on the enforcement information.

Method 200 enables UE 111 to consider requirement for an application when determining whether/how to enforce a rule related to traffic routing by checking the enforcement information. Therefore, enforcement efficiency may be improved with method 200.

For illustration rather than limitation, some example implementations for block 220 are shown in FIGS. 3-6. In an example implementation 300 shown in FIG. 3, upon receiving the rule at block 210, UE 111 checks at block 310 whether current PDU session associated with the traffic satisfies the rule received. If the current PDU session fails to satisfy the rule, at block 320, UE 111 determines whether a modification to the current PDU session associated with the traffic due to enforcement of the rule is allowed based on the enforcement information (e.g., the field of "PDU session Modification allowed" in Table 1 above). If modification to the current PDU session associated with the traffic is allowed, at block 330, UE 111 may enforce the rule by one of Solutions A-C. That is, UE 111 may modify the current PDU session to satisfy the rule; associate the traffic to a further PDU session selected from existing PDU sessions satisfying the rule; or create a new PDU session satisfying the rule for the traffic.

In some embodiments, besides the enforcement information, UE 111 may further considers whether switching the traffic from the current PDU session to a further PDU session is allowed, in order to make a better decision on enforcement. That is, UE 111 may enforce or reject the rule based on whether the modification to the current PDU session is allowed and whether the switching is allowed.

In some embodiments, UE 111 may check whether the switching is allowed according to a rule enforced previously (e.g., an initial URSP rule) and the rule received (e.g., an updated URSP rule), respectively; and if the switching is unallowable by both rules (e.g., SSC Mode 1 is selected in both the initial URSP rule and the updated URSP rule), UE 111 determines that the switching is unallowable.

Figure 4:
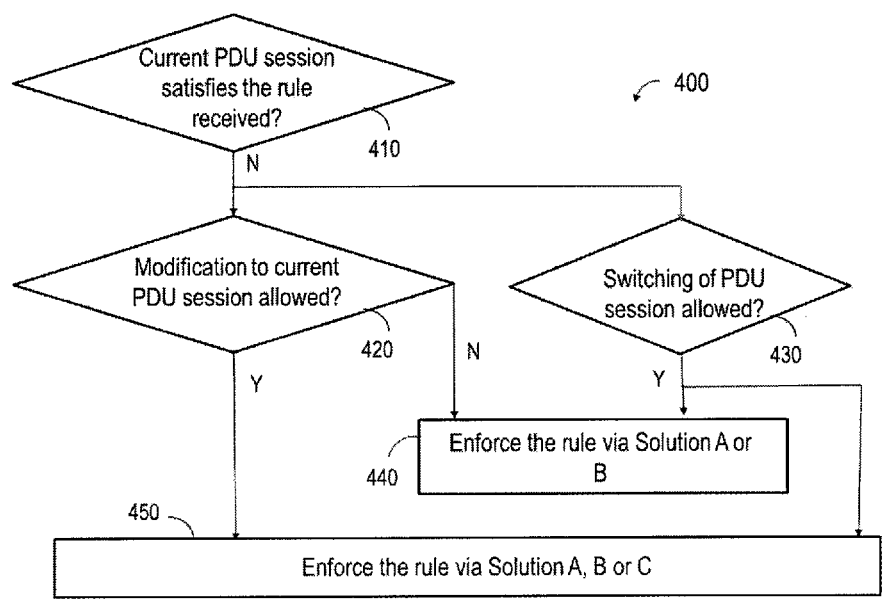

In an example implementation 400 shown in FIG. 4, UE 111 checks at block 410 whether current PDU session associated with the traffic satisfies the rule received. If the current PDU session fails to satisfy the rule, at block 420, UE 111 determines whether a modification to the current PDU session associated with the traffic due to enforcement of the rule is allowed based on the enforcement information. In addition, at block 430, UE checks whether switching the traffic from the current PDU session to a further PDU session is allowed. If the modification is unallowable but switching is allowed, at block 440, UE 111 may enforce the rule via Solution A or B, i.e., associating the traffic to a further PDU session selected from existing PDU sessions satisfying the rule; or creating a new PDU session satisfying the rule for the traffic. On the other hand, if both of the modification and the switching are allowed, UE 111 may enforce the rule by any of the Solutions A-C at block 450.

Figure 5:
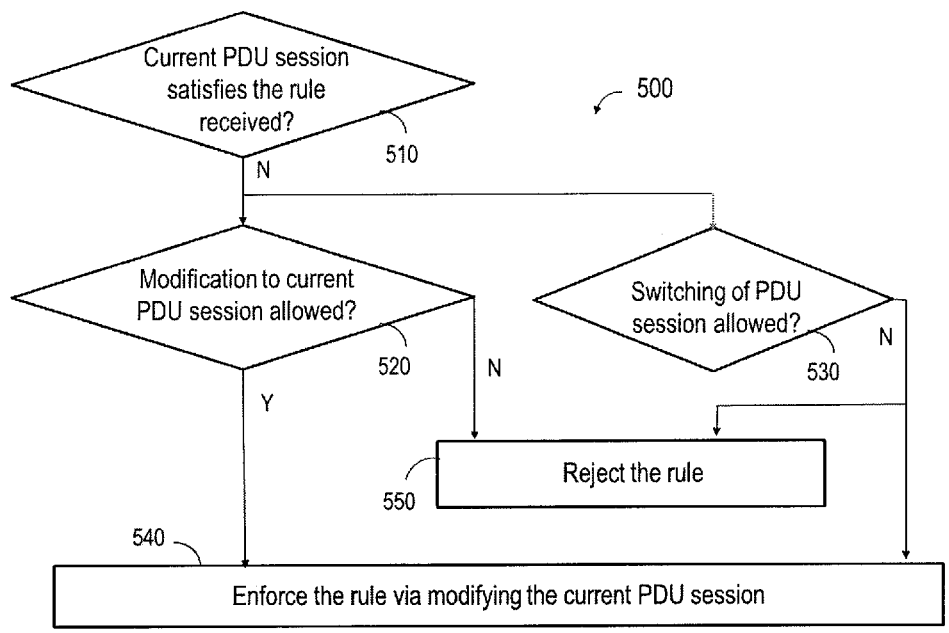

Another example implementation 500 for block 220 of FIG. 2 is shown in FIG. 5. Similar to FIG. 4, at block 510, UE 111 checks whether current PDU session associated with the traffic satisfies the rule received. If the current PDU session fails to satisfy the rule, at block 520, UE 111 determines whether a modification to the current PDU session associated with the traffic due to enforcement of the rule is allowed based on the enforcement information. In addition, at block 530, UE checks whether switching the traffic from the current PDU session to a further PDU session is allowed. Block 530 may be performed prior to or after block 520. If the modification is allowed but the switching is unallowable, at block 540, UE 111 may enforce the rule by modifying the current PDU session. On the other hand, at block 550, the rule may be rejected, if neither of the modification and the switching is allowed.

In some embodiments, when UE 111 decides to reject a rule, it may send a rejection message to a network device (e.g., PCF 121 in FIG. 1) from which the rule is received. Or in other words, rejecting the rule may comprise sending the rejection message to the network device.

It should be appreciated that in some embodiments, UE 111 may check whether PDU session switch is allowed before checking whether a modification to current PDU session due to enforcement of the rule is allowed, or vice versa. In an implementation 600 shown in in FIG. 6, if it is determined at block 610 that current PDU session cannot satisfy the received rule, UE 111 checks at block 630 whether PDU session switch is allowed, and if the switching is unallowable, UE 111 checks whether a modification to current PDU session due to enforcement of the rule is allowed at block 620. Then if the modification is allowed but switching is unallowable, at block 640, UE 111 may enforce the rule by modifying current PDU session. On the other hand, if neither of the modification and the switching is allowed, UE 111 may reject the rule by at block 650. However, it should be appreciated that embodiments are not limited to perform block 630 prior to block 620.

In some embodiments, at block 630, UE 111 may check whether the switching is allowed by a rule enforced previously and the rule received, respectively. If the switching is prohibited by both rules (e.g., SSC mode 1 is selected in both rules), UE 111 may determine that the switching is unallowable.

In some embodiments, if the modification is allowed but the switching is unallowable, UE 111 may further check another factor, e.g., whether a route selection related parameter for the traffic (e.g., the RSD Precedence included in a URSP rule, as shown in Table 6.6.2.1-3) matches with the rule; and in response to determining that the route selection parameter matches with the rule, UE 111 may enforce the rule by modifying the current PDU session to satisfy the rule.

Note that, in some embodiments, a plurality of traffic may be associated with the current PDU session, and in these embodiments, the UE may determine whether the route selection related parameter for each of the plurality of traffic associated with the current PDU session matches with the rule; and if the route selection related parameter for each of the plurality of traffic matches with the rule, UE 111 may determine that the route selection related parameter matches with the rule. As an example, in some embodiments, if the modification is allowed but the switching is unallowable (e.g., SSC Mode 1 is selected in both an initial URSP rule and the updated URSP rule received), UE checks, for each traffic, whether respective RSDs matches with the updated URSP rule. If the RSD for each traffic matches with the updated URSP rule, UE 111 modifies the PDU session; otherwise, the updated URSP rule may be rejected.

Figure 3:
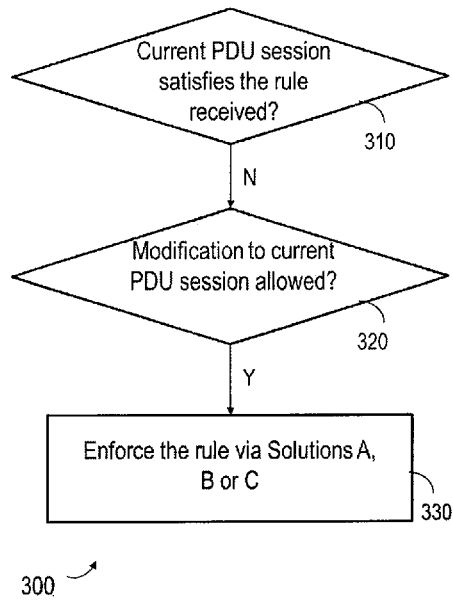
FIGS. 3-6 show different example implementations for block 220 of FIG. 2 according to embodiments of the present disclosure and a conventional method.
Figure 6:
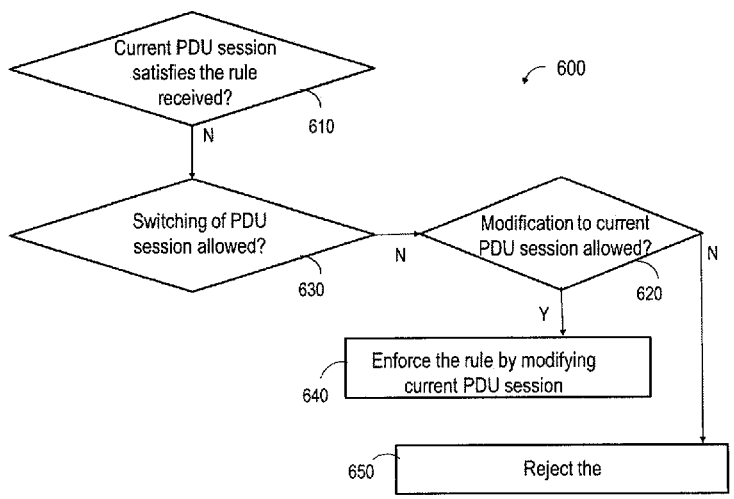

In the embodiments where a plurality of traffic may be associated with the current PDU session and enforcement information may be configured for each of the plurality of traffic, at block 320 in FIG. 3, block 420 in FIG. 4, block 520 in FIG. 5, or block 620 in FIG. 6, UE may determine whether a modification to the current PDU session associated with the traffic due to enforcement of the rule is allowed by taking enforcement information configured for all of the plurality of traffic into consideration. For example, at block 320, 420, 520, or 620, UE 111 may check enforcement information for all of the plurality of traffic, and if enforcement information for all of the plurality of traffic indicates that a modification to the current PDU session is allowed, UE 111 determines that the modification is allowed only.

Now referring back to FIG. 2. In some embodiment, the enforcement information received at block 210 may further include a validation condition for the rule, and at block 220, UE 111 may enforce or reject the rule further based on the validation condition. As an example, UE 111 may perform block 220 when the validation condition is satisfied.

The validation condition may comprise at least one of the following: time for enforcing the rule, allowed enforcement delay for the rule, and a location where the rule is applicable. In some embodiments, the time for enforcing the rule may indicate an exact time point. Alternatively, in some embodiments, the time for enforcing the rule may allow the UE 111 to enforce the rule at any time before the traffic restarts.

As shown in FIG. 2, in some embodiments, UE 111 may receive a notification on failure of new PDU session establishment due to enforcement of the updated URSP rule at block 215, and in such a case UE 111 may determine, at block 218, whether to enforce the rule by modifying an existing PDU session based on the enforcement information (e.g., "PDU session modification allowed") and optionally a route selection related parameter (e.g., RSD precedence value) for each traffic associated to the existing PDU session. For example, upon receiving the failure notification, UE 111 may evaluate whether it is possible to enforce the updated URSP rule by modifying an existing PDU session. During the evaluation, UE 11 may take into consideration the enforcement information (e.g., the field of "PDU session modification allowed" included in Table 1) and the RSD value of each traffic currently associated to the existing PDU session. In some embodiments, UE 111 may only evaluate modification of a PDU session which has the same SSC Mode Selection value as that configured in the updated URSP rule. Then at block 220, UE 111 may enforce or reject the rule based on the enforcement information and the determination at block 218. For example, if UE 111 determines at block 218 that the modification of the existing PDU session in impossible, then UE 111 may reject the rule at block 220; otherwise, UE 111 may enforce the rule by modifying the existing PDU session.

Figure 7:
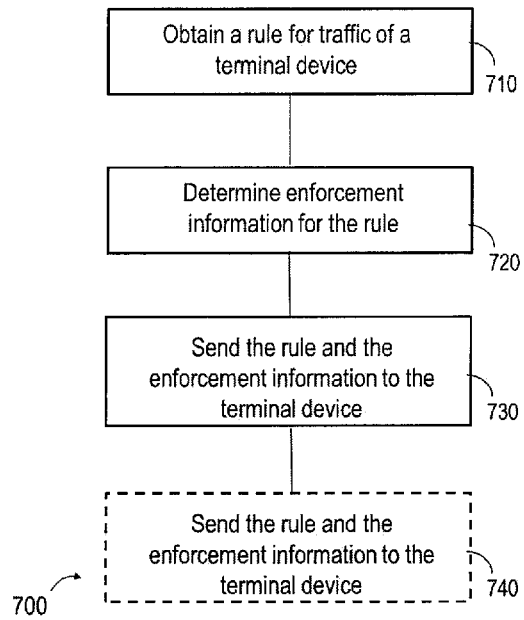
FIG. 7 shows a flowchart of a method in a network device according to an embodiment of the present disclosure.

FIG. 7 shows a flowchart of a method 700 implemented at a network device for enforcing a rule (e.g., a URSP rule) related to traffic routing. The network device may be, for example, the PCF 121 shown in FIG. 1. For ease of discussion, the method 700 will be described below with reference to PCF 121 and the communication network 100 illustrated in FIG. 1. However, embodiments of the present disclosure are not limited thereto.

As shown in FIG. 7, at block 710, PCF 121 obtains the rule for traffic of a terminal device, e.g., UE 111 in FIG. 1. In some embodiments, the rule may be obtained by the PCF 121 based on, for example but not limited to, at least one of the following: information from the UDR 123, preference of an operator, a requirement for an application associated with the traffic, a local configuration on load level per network slice instance, and a location of the terminal device. For example, the PCF 121 may obtain an initial URSP rule from the UDR 123, and obtains a URSP rule for the UE 111 based on the initial URSP rule and the location of the UE 111.

At block 720, PCF 121 determines enforcement information for the rule obtained at block 710. As described with reference to method 200 and FIGS. 2-6, the enforcement information may indicate whether a modification to a PDU session associated with the traffic due to enforcement of the rule is allowed, and/or, a validation condition of the rule. All descriptions provided above with respect to the enforcement information also apply here, and therefore, details of the enforcement information (e.g., the validation condition and the indication on whether a modification to a PDU session associated with the traffic due to enforcement of the rule is allowed) will not be repeated.

In some embodiments, the enforcement information may be determined by the PCF 121 based on, for example but not limited to, at least one of the following: preference of an operator, and a requirement for an application associated with the traffic. In some embodiments, the requirement for the application associated with the traffic may comprise a user equipment address continuity requirement for the application.

At block 730, PCF 121 sends the rule and the enforcement information to the UE 111. The enforcement information enables UE 111 to make a better decision on whether/how to enforce the rule received. In some embodiments, the enforcement information may be sent to the UE 111 as a part of the rule. For example rather than limitation, the rule may include information shown in Table 6.6.2.1-2 of 3GPP TS 23.503 vf10. In some embodiments, the rule may be extended to include the enforcement information, and the extended rule may include, for example, information shown in Table 1 of the present disclosure.

It should be appreciated that the enforcement information included in the extended rule may be optional. For example, at block 730, the PCF 121 may send an updated URSP rule with the enforcement information to UE 111. However, prior to sending the updated URSP rule, the PCF 121 may have already provided UE access selection and PDU Session related policy information to the UE 111 during an initial Registration procedure, and the rule sent to UE during the initial registration may not include the enforcement information.

In some embodiments, the UE 111 may reject the rule, as described with reference to method 200. In such embodiments, the PCF 111 may receive a message indicating rejection of the rule from the UE 111 at block 740. However, it should be appreciated that UE 111 may not necessarily send the rejection message when it rejects the rule. That is, the operation at block 740 may be optional.

Figure 8:
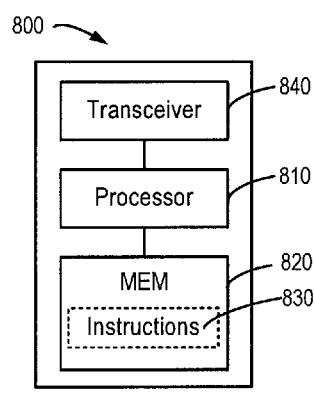
FIG. 8 illustrates a simplified block diagram of an apparatus that may be embodied as/in a network device or a terminal device.

FIG. 8 illustrates a simplified block diagram of an apparatus 800 that may be embodied in/as a terminal device, for example, the UE 111 shown in FIG. 1, or embodied in/as a network device, for example, the PDF 121 shown in FIG. 1.

As shown by the example of FIG. 8, apparatus 800 comprises a processor 810 which controls operations and functions of apparatus 800. For example, in some embodiments, the processor 810 may implement various operations by means of instructions 830 stored in a memory 820 coupled thereto. The memory 820 may be any suitable type adapted to local technical environment and may be implemented using any suitable data storage technology, such as semiconductor based memory terminal devices, magnetic memory terminal devices and systems, optical memory terminal devices and systems, fixed memory and removable memory, as non-limiting examples. Though only one memory unit is shown in FIG. 8, a plurality of physically different memory units may exist in apparatus 800.

The processor 810 may be any type adapted to proper local technical environment, and may include one or more of general purpose computers, special purpose computers, microprocessors, digital signal processors DSPs and processors based on multicore processor architecture, as non-limiting examples. The apparatus 800 may also comprise a plurality of processors 810.

The processors 810 may also be coupled with a transceiver 840 which enables reception and transmission of information. For example, the processor 810 and the memory 720 can operate in cooperation to implement method 200 or 700 described with reference to FIGS. 2-7. It shall be appreciated that all the features described above with reference to FIGS. 2-7 also apply to apparatus 800, and therefore will not be detailed here.

Various embodiments of the present disclosure may be implemented by a computer program or a computer program product executable by one or more of the processors (for example processor 810 in FIG. 8), software, firmware, hardware or in a combination thereof.

Although some of the above description is made in the context of a communication network shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/grogram 830 in FIG. 8). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

The techniques described herein may be implemented by various means so that an apparatus implementing one or more functions of a corresponding apparatus described with an embodiment comprises not only prior art means, but also means for implementing the one or more functions of the corresponding apparatus and it may comprise separate means for each separate function, or means that may be configured to perform two or more functions. For example, these techniques may be implemented in hardware (e.g., circuit or a processor), firmware, software, or combinations thereof. For a firmware or software, implementation may be made through modules (e.g., procedures, functions, and so on) that perform the functions described herein.

Some example embodiments herein have been described above with reference to block diagrams and flowchart illustrations of methods and apparatuses. It will be appreciated that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept may be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method of traffic routing, comprising:
   receiving a rule for traffic, the rule specifying a routing policy of the traffic;
   receiving enforcement information for the rule, wherein the enforcement information includes a validation condition for the rule and the validation condition comprises at least a location where the rule is applicable, and an indication whether a modification to a current protocol data unit (PDU) session associated with the traffic is allowed or unallowed; and
   controlling enforcement of the rule based on the enforcement information including the validation condition by performing at least one of modifying the current PDU session, associating the traffic to a PDU session selected from existing PDU sessions, or creating, for the traffic, a new PDU session.

2. The method of claim 1, wherein the enforcement information also indicates whether a modification to a Protocol Data Unit (PDU) session associated with the traffic due to enforcement of the rule is allowed, and wherein controlling enforcement of the rule based on the enforcement information comprises:
   in response to a current PDU session failing to satisfy the rule,
      determining whether a modification to the current PDU session associated with the traffic due to enforcement of the rule is allowed based on the enforcement information; and
      determining whether it is allowed to switch the traffic from the current PDU session to a further PDU session; and
   controlling enforcement of the rule based on whether the modification and the switching are allowed.

3. The method of claim 2, wherein controlling enforcement of the rule based on whether the modification and the switching are allowed comprises:
   in response to determining that the modification is unallowable and the switching is allowed, enforcing the rule by one of:
      associating the traffic to the further PDU session selected from the existing PDU sessions satisfying the rule; or
      creating, for the traffic, the new PDU session satisfying the rule.

4. The method of claim 2, wherein controlling enforcement of the rule based on whether the modification and the switching are allowed comprises:
   in response to determining that the modification is allowed and the switching is unallowable, enforcing the rule by:
      modifying the current PDU session to satisfy the rule.

5. The method of claim 2, wherein controlling enforcement of the rule based on whether the modification and the switching are allowed comprises:
   in response to determining that the modification is allowed and the switching is unallowable, determining whether a route selection related parameter for the traffic matches with the rule; and
   in response to determining that the route selection parameter matches with the rule, enforcing the rule by modifying the current PDU session to satisfy the rule.

6. The method of claim 5, determining whether a route selection related parameter for the traffic matches with the rule comprises:
   determining whether the route selection related parameter for each of the traffic associated with the current PDU session matches with the rule; and
   determining that the route selection related parameter matches with the rule, if the route selection related parameter for each of the traffic associated with the current PDU session matches with the rule.

7. The method of claim 2, wherein controlling enforcement of the rule based on the enforcement information comprises:
   in response to determining that neither of the modification and the switching is allowed, rejecting the rule.

8. The method of claim 2, wherein controlling enforcement of the rule based on the enforcement information comprises:
   in response to a current PDU session failing to satisfy the rule, checking whether it is allowed to switch the traffic from the current PDU session to a further PDU session;
   in response to the switching being unallowable, determining whether a modification to the current PDU session associated with the traffic due to enforcement of the rule is allowed based on the enforcement information; and
   controlling enforcement of the rule based on the determination.

9. The method of claim 2, wherein determining whether switching the traffic from the current PDU session to a further PDU session is allowed comprises:
   checking whether the switching is allowed by a rule enforced previously and the rule received, respectively; and
   determining that the switching is unallowable, if the switching is unallowable by both the rule enforced previously and the rule received.

10. The method of claim 1, wherein a plurality of traffic are associated with the current PDU session and enforcement information is configured for each of the plurality of traffic, and wherein determining whether a modification to the current PDU session associated with the traffic due to enforcement of the rule is allowed comprises: checking enforcement information for all of the plurality of traffic; and determining that the modification is allowed if enforcement information for all of the plurality of traffic indicates that a modification to the current PDU session is allowed.

11. The method of claim 1, wherein controlling the enforcement comprises:
rejecting the rule by sending a rejection message to a network device from which the rule is received.

12. The method of claim 1, wherein the validation condition comprises at least one of the following:
time for enforcing the rule; or
allowed enforcement delay for the rule.

13. The method of claim 1, wherein the receiving comprises:
receiving a message including the rule and the enforcement information from a Policy Control Function, PCF.

14. The method of claim 1, wherein the enforcement information also indicates whether a modification to a Protocol Data Unit (PDU) session associated with the traffic due to enforcement of the rule is allowed, and wherein the method further comprises:
receiving a notification on failure of a new PDU session establishment due to enforcement of the rule;
determining whether to enforce the rule by modifying an existing PDU session based on the enforcement information and a route selection related parameter for each traffic associated with the existing PDU session; and
controlling enforcement of the rule based on the determination.

15. A method for enforcing a rule related to traffic routing, comprising:
obtaining the rule for traffic of a terminal device;
determining enforcement information for the rule wherein the enforcement information includes a validation condition for the rule, and the validation condition comprises at least a location where the rule is applicable, and an indication of allowance or disallowance of at least one of modifying a current protocol data unit (PDU) session; and
sending the rule and the enforcement information including the validation condition to the terminal device.

16. The method of claim 15, wherein obtaining the rule comprises:
obtaining the rule based on at least one of the following:
information from a unified data repository, UDR,
preference of an operator;
a requirement for an application associated with the traffic;
a local configuration on load level per network slice instance; or
a location of the terminal device.

17. The method of claim 15, wherein determining enforcement information comprises:
determining the enforcement information based on at least one of the following:
preference of an operator; or
a requirement for an application associated with the traffic.

18. The method of claim 17, wherein the requirement for an application associated with the traffic comprises a user equipment address continuity requirement for the application.

19. The method of claim 15, wherein the validation condition comprises at least one of the following:
time for enforcing the rule; or
allowed enforcement delay for the rule.

20. The method of claim 15, further comprises:
receiving a message from the terminal device, the message indicating rejection of the rule.

21. The method of claim 15, wherein the rule includes a user equipment (UE) Route Selection Policy, URSP, rule.

22. A terminal device, comprising:
at least one processor; and
at least one memory including computer program codes;
the at least one memory and the computer program codes are configured to, with the at least one processor, cause the terminal device at least to:
receive a rule for traffic, the rule specifying a routing policy of the traffic;
receive enforcement information for the rule, wherein the enforcement information includes a validation condition for the rule, and the validation condition comprises at least a location where the rule is applicable, and an indication whether a modification to a current protocol data unit (PDU) session associated with the traffic is allowed or unallowed; and
control enforcement of the rule based on the enforcement information including the validation condition by performing at least one of modifying the current PDU session, associating the traffic to a PDU session selected from existing PDU sessions, or creating, for the traffic, a new PDU session.

* * * * *